United States Patent [19]

Heescher

[11] Patent Number: 4,536,997
[45] Date of Patent: Aug. 27, 1985

[54] REINFORCED CONSTRUCTION PANEL

[75] Inventor: Felix Heescher, Horstel-Bevergern, Fed. Rep. of Germany

[73] Assignee: Rohm GmbH Chemische Fabrik, Darmstadt, Fed. Rep. of Germany

[21] Appl. No.: 441,173

[22] Filed: Nov. 12, 1982

[30] Foreign Application Priority Data

Mar. 7, 1981 [DE] Fed. Rep. of Germany ....... 3108711

[51] Int. Cl.$^3$ ............................................. E04B 1/32
[52] U.S. Cl. ......................................... 52/86; 52/222; 135/102
[58] Field of Search ................... 52/86, 788, 200, 222; 135/102, 905; 47/28, 29

[56] References Cited

U.S. PATENT DOCUMENTS 4,292,773 10/1981 Laing ..................................... 52/788

FOREIGN PATENT DOCUMENTS 2800811 2/1979 Fed. Rep. of Germany .
2414604 1/1978 France .

Primary Examiner—J. Karl Bell
Attorney, Agent, or Firm—Oblon, Fisher, Spivak, McClelland & Maier

[57] ABSTRACT

A reinforced construction panel which is bent around a longitudinal flexure axis. The panel has a plurality of parallel, dovetail-shaped grooves in its inner surface. Each of the dovetail-shaped grooves lies in a plane which is perpendicular to the longitudinal flexure axis. A number of tension elements, each one of which is disposed in a plane which is perpendicular to the longitudinal flexure axis, end in two male fittings, one at either end. Each of the male fittings is sized and shaped so as to be received and held in one of the parallel, dovetail-shaped grooves.

9 Claims, 3 Drawing Figures

REINFORCED CONSTRUCTION PANEL

The invention relates to a ribbed panel, preferably a double or multiple panel, usable as a structural element and made from transparent plastic.

Particularly in the construction of greenhouses, but by no means confined thereto, the use of so-called double or multiple ribbed panels consisting of two plane plastic sheets joined together by regularly spaced ribs is well-known. Moreover, these panels are commonly curved, their curvature having a not very large radius and being oriented about a flexure axis transverse to the longitudinal direction of the ribs. Attempts to bend the panels around a flexure axis parallel to the longitudinal direction of the ribs resulted in the destruction of the panels. Such flexible double or multiple ribbed panels are preferably composed of polycarbonate. Since curving is only possible in the direction transverse to the direction of the ribs, the double panels are for the most part available only as flat construction elements, and therefore expensive connecting elements made of metal or plastic or combinations thereof have to be attached to the edges of these planar construction elements in order both to join the panels firmly and, at the same time, to allow movement of the panels to accommodate thermal expansion.

The application of the panels of current design, especially for covering greenhouses, swimming pools and the like, i.e. for roofing large areas, has shown that an unobjectionable satisfactory seal between adjoining panels can be achieved only with difficulty, i.e. at considerable expense, and that these parts are subject to wear and require a great deal of maintenance, factors that have adversely affected the use of these panels. In addition, the structural elements supporting these panels entail considerable expense, necessitating the construction of solid, therefore costly buildings.

It is an object of the invention to construct the conventional double or multiple ribbed panels, preferably made of polycarbonate, in such a way that structural elements can be carried by the panel itself, in order to provide for fastening these structural elements to the panels directly during the manufacturing process.

This object of the invention is achieved by the characteristics cited in the claims, especially by the provision that the panels can accept structural elements capable of supporting the panels and, if necessary, of securing the shaping and the shape retention of the panels.

It is, for instance, possible to drill holes in the panels and to insert and anchor structural elements in the holes.

It is also possible to make an opening in at least one of the two panel surfaces connected by the ribs or to manufacture the panel with an opening thereby forming a recess into which a male member can be fitted which supports or, if required, shapes the panel since it is inserted and retained in this slot.

Moreover, according to the invention, grooves in the upper and/or lower surface are provided, running in the direction transverse to the flexure axis of the ribbed panel and either formed integrally with the panel material or bonded to the panel material.

These grooves are preferably of dovetail cross section; complementary ("male") structural units fit into these recessed grooves in such a way that they are movable within the slots formed by the grooves, but can be fixed in their positions. They may thus serve as fastening points for supporting and structural elements, making it possible to bend the panels and to maintain their curvature by clamped tension elements which are anchored in the grooves provided in the panel.

In accordance with an essential feature of the invention, provision is made for the male structural units to be movable transverse to the slots in which they are inserted, thereby accommodating, and compensating for, thermal stresses and expansions of the panels in all possible directions, since the male units are able to slide along the longitudinal axis of the slots or grooves, while elongated recesses, for instance, or similar holes transverse to the longitudinal axis, are present in the male unit, allowing a displacement transverse to the axis of the groove or slot.

Along with the tension elements, fastening units may be disposed in the grooves which may, for instance, be used for attachment to the solid foundation and thus for anchoring of the structural units which, for instance, may be shaped in the form of a tunnel.

Moreover, the grooves in the panels may serve as receptacles for additional components, such as shades, etc., and since the exterior side of the panels is also provided with suitable grooves, any required accessories may similarly be attached in the simplest way to the exterior side of the panels.

The panels constructed according to the design discussed above are advantageously used in the construction of greenhouses, especially for early harvesting in the open field cultivation of vegetables.

One embodiment of the invention will be illustrated with the aid of the following drawings, in which.

Figure 1:
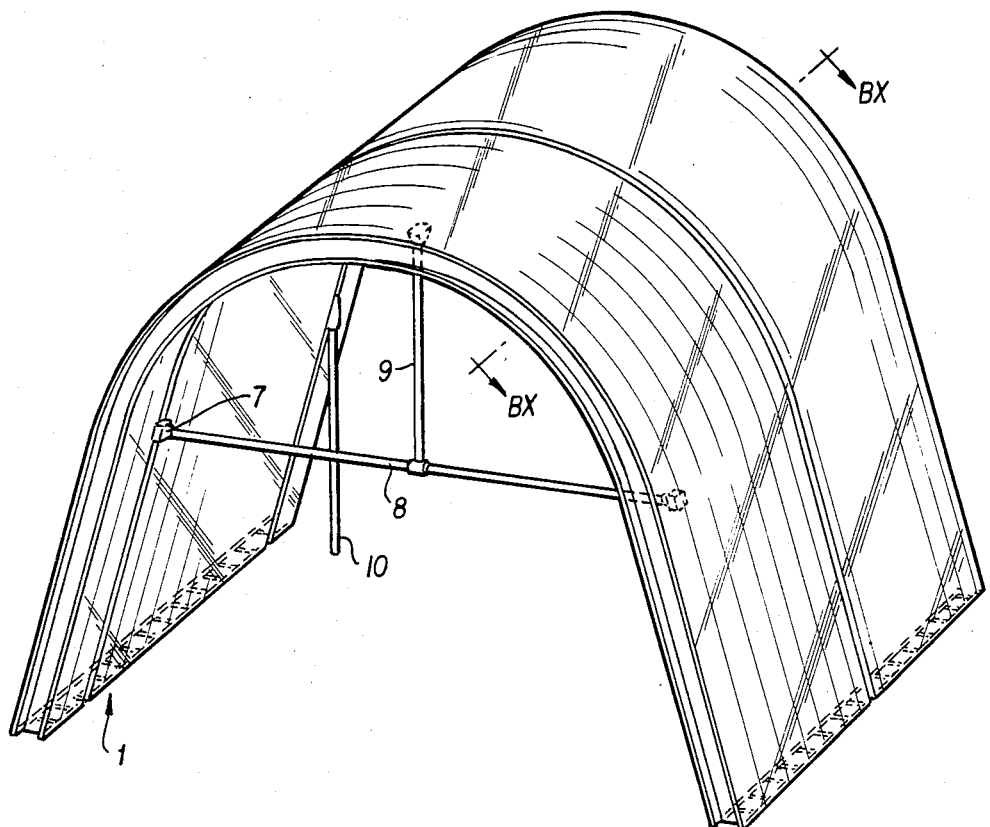
FIG. 1 shows a perspective diagrammatic view of the new panel as formed into a curved, tunnel-shaped structural unit.
Figure 2:
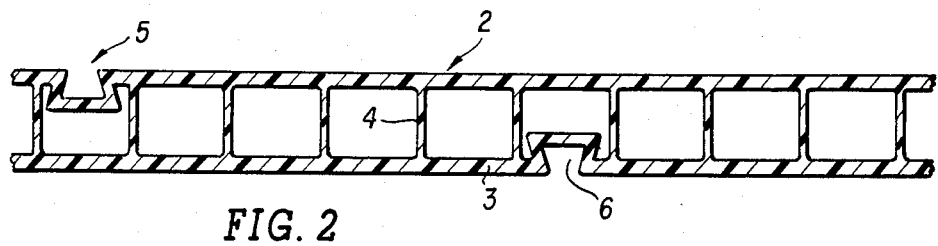
FIG. 2 shows, in a planar view, the grooves present in the panel so as to clarify the basic idea of the invention.

In FIG. 1, a ribbed panel, made, for example, of polycarbonate, is denoted as 1. It has an upper panel surface 2 and a lower panel surface 3 while the ribs connecting these two panels are designated by 4. FIG. 1 shows the flexure axis BX—BX; obviously, the curving of the panel around the flexure axis must be transverse to the longitudinal direction of the ribs.

Grooves of dovetail section denoted by 5 and 6, are provided on the upper and/or lower panel surfaces, and the narrower width is always oriented towards the exterior of the panel. It is possible with this type of Male fittings 7, shown in FIG. 1, may cooperate with these dovetail grooves, and, in addition to having a shape fitting into the grooves, may also be equipped with means for immobilizing the male fittings 7 in the grooves 5 and 6, so that movement of the male fittings, if not desired, can be prevented.

In the embodiment shown in FIG. 1, 8 denotes a tension element maintaining the curvature of the panel itself, once it has been established. This tension element may be further connected to the interior side of the panel by an additional supporting element 9.

For the clarification of this concept of the invention, an additional tension or construction element, designated as 10, is shown; it serves to anchor the panel to the ground or a suitable foundation.

It is apparent that the panel constructed according to the invention may be erected directly over a planting bed as, for instance, in greenhouse construction, but that it is equally possible to put such panels on top of a foundation or supporting walls. Obviously, other applications are also within the scope of the invention; panels corresponding to the embodiment illustrated in FIG. 1 may be joined together in any number and may thus together form, for instance, the roof of a greenhouse, swimming pool or large hall.

Figure 3:
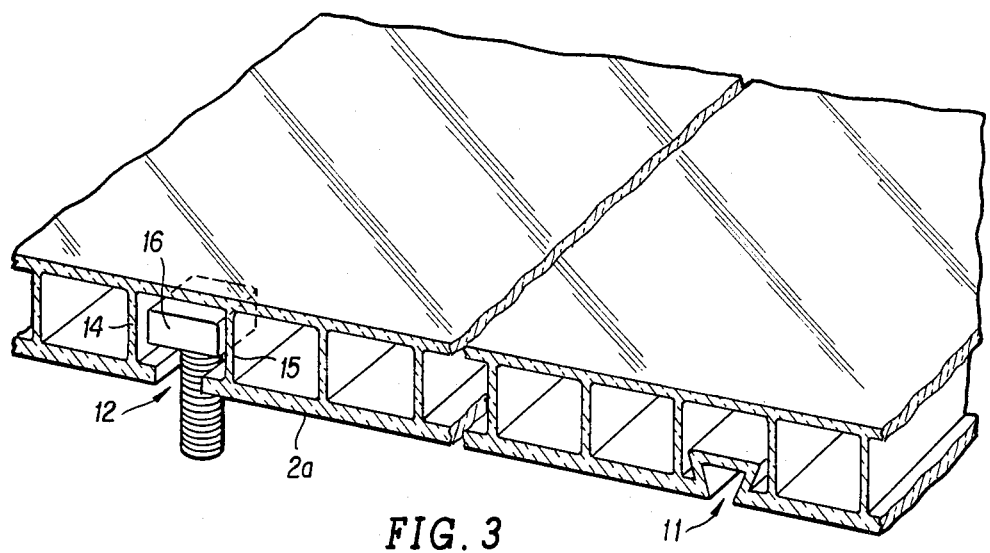
FIG. 3 shows a flat panel according to the invention.

In FIG. 3 is shown a flat, ribbed double panel equipped with a slot-shaped groove 11 into which, for instance, the male fittings 7, illustrated in FIG. 1, may be inserted. As mentioned in the introduction to the specification, these male fittings 7 may be movable transverse to the longitudinal axis of the groove 11 and may therefore compensate for thermal tensions. The desired universal freedom of movement is therefore attained by the interaction of motion along the longitudinal axis of groove 11 and motion transverse to this direction provided for in the male fitting 7.

Moreover, a slot 12 is shown in FIG. 3 produced either by cutting the panel surface 2a or by molding it during the manufacturing process. A slot is produced thereby that is smaller than the distance between the ribs 14 and 15. This arrangement makes it possible to insert a T-shaped male unit 16 that now assists in supporting the panel. It is possible with this type of construction to keep flat panels in position simply by the use of structural elements, as illustrated in FIG. 1 and to erect in this way, for instance, a greenhouse, a hall, a swimming pool enclosure, etc. FIG. 3 shows that the panel surface 2a may be strengthened for this purpose.

I claim:
1. A structure comprising:
(a) a panel bent around a longitudinal flexure axis, said panel having a plurality of parallel, dovetail-shaped grooves in the inner surface thereof, each of said plurality of parallel, dovetail-shaped grooves lying in a plane which is perpendicular to said longitudinal flexure axis, and
(b) a plurality of tension elements each one of which is disposed in a plane which is perpendicular to said longitudinal flexure axis, each of said plurality of tension elements comprising two male fittings, one at either end, each of said male fittings being sized and shaped so as to be received and held in one of said plurality of parallel, dovetail-shaped grooves.

2. A structure as recited in claim 1 wherein said panel is made of transparent plastic.

3. A structure as recited in claim 1 wherein said panel comprises two spaced panel surfaces connected by ribs, the bending of said panel being transverse to the longitudinal direction of said ribs.

4. A structure as recited in claim 3 wherein:
(a) said parallel, dovetail-shaped grooves are formed in the inner one of said two spaced panel surfaces and
(b) the inner one of said two spaced panel surfaces is thicker than the outer one of said two space panel surfaces.

5. A structure as recited in claim 1 wherein:
(a) said grooves are larger in their axial directions than the length of said male members and
(b) said male members are movable in said grooves in the axial direction.

6. A structure as recited in claim 5 and further comprising means for selectively fixing said male members against axial motion in said grooves.

7. A structure as recited in claim 1 and further comprising a plurality of supporting elements each one of which is disposed in a plane which is perpendicular to said longitudinal flexure axis, each one of said plurality of supporting elements being connected at one end to a corresponding one of said plurality of tension elements and having a male fitting at the other end which is sized and shaped so as to be received and held in one of said plurality of parallel, dovetailed-shaped grooves.

8. A structure as recited in claim 7 wherein each one of said plurality of supporting elements extends upwardly from the midpoint of the corresponding one of said plurality of tension elements.

9. A structure as recited in claim 1 and further comprising means for anchoring said panel to the ground or a suitable foundation.

* * * * *